United States Patent
Guiet

(10) Patent No.: US 11,425,853 B2
(45) Date of Patent: *Aug. 30, 2022

(54) AGRICULTURAL IMPLEMENT, TOW BAR ASSEMBLY, AND TOWING VEHICLE/IMPLEMENT COMBINATION

(71) Applicant: DEERE & COMPANY, Moline, IL (US)

(72) Inventor: Lionel Guiet, Gray (FR)

(73) Assignee: DEERE & COMPANY, Moline, IL (US)

( * ) Notice: Subject to any disclaimer, the term of this patent is extended or adjusted under 35 U.S.C. 154(b) by 263 days.

This patent is subject to a terminal disclaimer.

(21) Appl. No.: 16/717,198

(22) Filed: Dec. 17, 2019

(65) Prior Publication Data
US 2020/0245524 A1 Aug. 6, 2020

(30) Foreign Application Priority Data
Feb. 1, 2019 (DE) .......................... 102019201333.3

(51) Int. Cl.
*A01B 69/00* (2006.01)
*A01B 59/042* (2006.01)
*B60D 1/42* (2006.01)

(52) U.S. Cl.
CPC .......... *A01B 69/003* (2013.01); *A01B 59/042* (2013.01); *B60D 1/42* (2013.01)

(58) Field of Classification Search
CPC ............................ A01B 69/003; A01B 59/042
See application file for complete search history.

(56) References Cited

U.S. PATENT DOCUMENTS

| 3,077,232 A * | 2/1963 | Frolik ................. A01B 59/042 172/450 |
| 3,331,619 A * | 7/1967 | Muelling ............... B60D 1/155 280/460.1 |
| 4,065,914 A | 1/1978 | Phillips et al. |
| 5,255,756 A | 10/1993 | Follmer et al. |
| 9,706,697 B2 | 7/2017 | Wilkening et al. |
| 10,462,953 B2 | 11/2019 | Frascella |
| 2004/0161087 A1* | 8/2004 | Taylor ................. A01B 71/066 379/200 |

(Continued)

FOREIGN PATENT DOCUMENTS

| DE | 000D0008107MAZ | 2/1951 |
| DE | 102009047585 A1 | 6/2011 |

(Continued)

OTHER PUBLICATIONS

Anderson, Biobaler, pp. 1-12.
European Search Report issued in counterpart application No. 20153573.9 dated Jul. 6, 2020 (08 pages).

*Primary Examiner* — Jacob D Knutson

(57) ABSTRACT

An agricultural implement includes a tow bar assembly for towing the implement with a towing vehicle. The tow bar assembly includes a tow bar mounted to a part of the implement by a first pivot bearing so as to be pivotable about a first vertical axis. The tow bar assembly includes an arm parallel with and spaced vertically below the tow bar. The arm is attached to the part of the implement by a second pivot bearing so as to be pivotable about a second vertical axis that is coaxially located with the first vertical axis.

21 Claims, 6 Drawing Sheets

(56) References Cited

U.S. PATENT DOCUMENTS

| | | | | |
|---|---|---|---|---|
| 2005/0095104 A1* | 5/2005 | Bay | ...................... | E02F 3/3631 |
| | | | | 414/500 |
| 2005/0194156 A1* | 9/2005 | Job | ...................... | A01B 45/026 |
| | | | | 172/21 |
| 2020/0068780 A1* | 3/2020 | Anderson | ............ | A01B 59/002 |
| 2020/0247196 A1* | 8/2020 | Guiet | ..................... | B60K 25/00 |

FOREIGN PATENT DOCUMENTS

| | | | | | |
|---|---|---|---|---|---|
| EP | | 2082637 | A1 | 7/2009 | |
| WO | WO-2013175097 | A1 | * | 11/2013 | ............. A01B 71/06 |
| WO | WO2013175097 | A1 | | 11/2013 | |

\* cited by examiner

AGRICULTURAL IMPLEMENT, TOW BAR ASSEMBLY, AND TOWING VEHICLE/IMPLEMENT COMBINATION

CROSS-REFERENCE TO RELATED APPLICATIONS

This application claims the benefit of German Patent Application No. DE 102019201333.3, filed on Feb. 1, 2019, the disclosure of which is hereby incorporated by reference.

TECHNICAL FIELD

The disclosure generally relates to an agricultural implement having a tow bar assembly.

BACKGROUND

Agricultural implements may include a tow bar for towing the implement with a towing vehicle. One end of the tow bar may be attached to an implement part by a first pivot bearing, so that the trailing implement part of the agricultural implement may pivot about a first vertical axis. On account thereof, the tow bar can rotate in relation to the trailing implement part, and the towed agricultural implement, for example in an operating position, can run so as to be lateral to the track of the towing vehicle and when travelling on the road can run centrally behind the towing vehicle.

DE 2710097 discloses an agricultural implement, e.g., a round bale press, having a tow bar in which by means of a first pivot bearing is pivotably mounted on the trailing implement part. As such, the tow bar of the agricultural implement may bend or pivot in relation to the trailing implement part.

EP 2082637 A1 similarly discloses a towed agricultural implement in which the tow bar is adjustable in relation to the trailing implement such that the towed agricultural implement may be positioned and/or run lateral to the track of the towing vehicle.

The tow bars described above exhibit a shortcoming in terms of the stability of the implement, in particular of the first pivot bearing. For example, in the operating state of the implement a torque or a force by virtue of torsioning, dragging, or tilting of the trailing implement part can engage on the tow bar, in particular on the first pivot bearing, in such a manner that the latter is damaged or even destroyed. It is thus a substantial problem of the known implements having tow bars that said tow bars are prone to malfunctioning and unstable, thus are at the limits of feasibility in constructive and technical terms.

SUMMARY

An agricultural implement is provided. The agricultural implement includes a frame, and a tow bar extending along a central longitudinal axis from the frame. An arm is attached to the tow bar and is disposed in spaced vertical relationship along a first vertical axis relative to the tow bar. A first pivot bearing rotatably supports the tow bar for rotation of the tow bar relative to the frame about the first vertical axis. The first vertical axis is perpendicular to the central longitudinal axis of the tow bar. A second pivot bearing rotatably supports the arm for rotation of the arm relative to the frame about a second vertical axis. The second vertical axis is perpendicular to the central longitudinal axis of the tow bar.

In one aspect of the disclosure, the first pivot bearing and the second pivot bearing are spaced from each other along both the first vertical axis and the second vertical axis. In another aspect of the disclosure, the first vertical axis and the second vertical axis are parallel with each other and/or are co-axially located.

In one aspect of the disclosure, a first actuator is attached to the tow bar. The first actuator is operable to move the tow bar relative to the frame to adjust a pivot angle. The pivot angle is defined between the central longitudinal axis of the tow bar and a central longitudinal axis of the frame.

In another aspect of the disclosure, a yoke is attached to the frame. The first pivot bearing interconnects the yoke and the tow bar, and the second pivot bearing interconnects the yoke and the arm. The first actuator is further attached to and interconnects the yoke and the tow bar.

In another aspect of the disclosure, a drive component is vertically disposed between the arm and the tow bar. The drive component is also vertically disposed between the first pivot bearing and the second pivot bearing. The drive component may include a shaft, and is rotatable and operable to communicate torque between the towing vehicle and the implement.

In one aspect of the disclosure, the arm defines an opening with the drive component extending through the opening. The drive component may be supported by the arm.

In one aspect of the disclosure, a tensioning installation is attached to the yoke at the second pivot bearing. The tensioning installation is attached to the arm at a third pivot bearing.

In another aspect of the disclosure, at least one fourth pivot bearing interconnects the yoke and the frame for rotation about a first pivot axis. The first pivot axis is horizontal and perpendicular to the first vertical axis and the second vertical axis. A second actuator may be attached to the frame and the yoke. The second actuator is operable to move the yoke and the tow bar about the first pivot axis relative to the frame to adjust a tilt angle. The tile angle is defined between the central longitudinal axis of the tow bar and a vertical axis of the frame.

In another aspect of the disclosure, a control unit is disposed in communication with the first actuator and the second actuator. The control unit is operable to control the first actuator to adjust the pivot angle, and control the second actuator to adjust the tilt angle.

The above features and advantages and other features and advantages of the present teachings are readily apparent from the following detailed description of the best modes for carrying out the teachings when taken in connection with the accompanying drawings.

DETAILED DESCRIPTION

Figure 1:
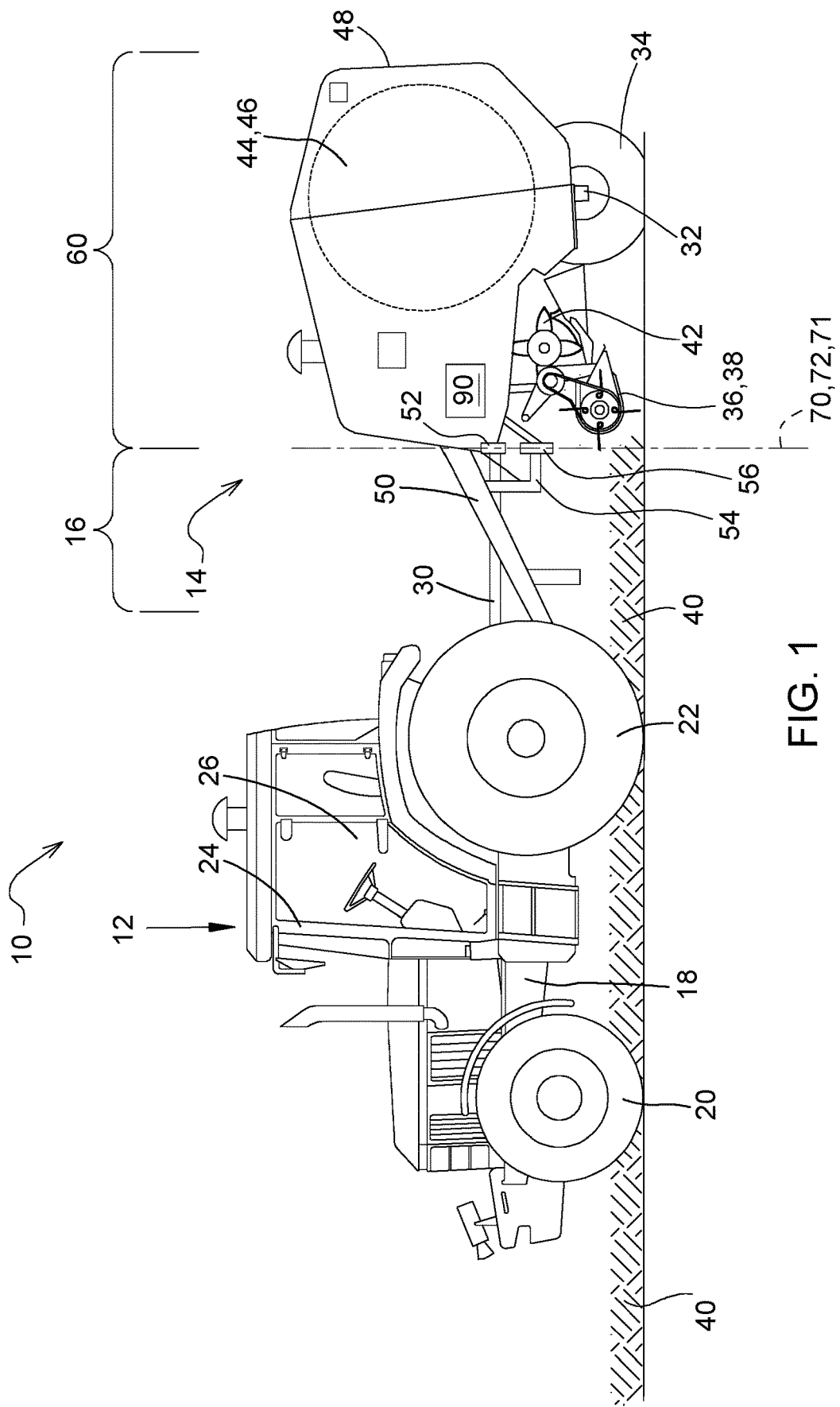
FIG. 1 is a schematic elevation view of a combination of a towing vehicle and an agricultural implement.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "substantially" or "approximately" are understood by those of ordinary skill to refer to reasonable ranges outside of the given value, for example, general tolerances associated with manufacturing, assembly, and use of the described embodiments.

In one aspect of the disclosure, an agricultural implement having a tow bar assembly for towing the agricultural implement with a towing vehicle is provided. The implement includes a ground-engagement means for support on the soil, and a tow bar assembly including a tow bar for attachment to a towing vehicle. An end of the tow bar, by means of a first pivot bearing, is mounted on an implement part that trails the tow bar assembly, or on a tow bar yoke of the tow bar, so as to be pivotable about a first vertical axis. The tow bar assembly furthermore includes a tow bar arm, which can in particular extend from the tow bar. The tow bar arm, at one tow bar arm end, by means of a second pivot bearing, is mounted on the trailing implement part or the tow bar yoke so as to be pivotable about a second vertical axis.

The agricultural implement can be a collection vehicle for harvested crops, for example a bale press for rectangular or round bales, preferably a round bale press, or a loader wagon, in particular having a receiving installation, or a mower, or a hay-making machine, or a rotary hay rake, or a swath rake. The ground-engagement means can either be wheels or track chains and can be coupled to the implement, in particular to the trailing implement by means of an implement axle, by way of a frame or a chassis of the trailing implement part. The agricultural implement, in particular the trailing implement part, can be supported on the soil especially by wheels. The implement, in particular the trailing implement part, can comprise a tilling element that interacts with a field. The tilling element can in particular be a crops-receiving unit which serves for receiving a swath from the soil. The implement, in particular the trailing implement part, can furthermore comprise a container, in particular in the form of a press chamber or a loading container, for receiving the harvested crops received.

The tow bar assembly includes the tow bar which can in particular be an elongate tow bar. The tow bar assembly can moreover include the tow bar yoke. The tow bar at another end can have a connector installation, for example a towing eye, for coupling the tow bar assembly to the towing vehicle so that the implement by means of the tow bar assembly is capable of being coupled to the towing vehicle. To this end, for example a coupling part, for example a coupling or a coupling yoke or can be provided for disposal on the towing vehicle. On account thereof, the coupling part and the connector installation can be capable of being coupled to one another at a coupling point of the coupling part and/or at an articulation point that is spaced apart from the coupling point. The tow bar arm can be configured as part of the tow bar or else as a component that is separate from the tow bar and is connectable to the tow bar, or as a component that is connectable to the tow bar. The tow bar arm can be spaced apart from and/or be parallel to the tow bar and/or extend in the direction of the first pivot bearing, in particular extend parallel to the tow bar in the direction of the first pivot bearing. The tow bar yoke can be configured as a yoke-shaped component. Moreover, the tow bar yoke can be mounted on the trailing implement part, in particular on the frame of the implement, so as to be pivotable about a first pivot axis. The tow bar yoke can be disposed between the tow bar and the trailing implement part.

The first and/or the second vertical axis, conjointly with a longitudinal axis of the implement, in particular the longitudinal central axis of the implement, and/or the longitudinal axis of the tow bar, in particular the longitudinal central axis of the tow bar, can enclose an angle of 75 degrees to 105 degrees, preferably an angle of 85 degrees to 95 degrees, especially an angle of 90 degrees. The first and/or the second vertical axis can be an axis that is vertical or runs vertically to the longitudinal axis of the implement and/or to the longitudinal axis of the tow bar, in particular also an orthogonal first and/or second vertical axis.

The torques and/or forces that act on the implement, in particular the tow bar assembly, are distributed by way of the first pivot bearing and the second pivot bearing, thus not by way of only a single pivot bearing. The agricultural implement having the tow bar assembly thus has the advantage that the stability of the coupling of the tow bar assembly to the trailing implement part is increased and the distribution of forces is improved. On account thereof, the implement, in particular the connection of the trailing implement part to the tow bar assembly, and/or the coupling of the implement to the towing vehicle, are less prone to malfunctioning and/or configured so as to be more stable in terms of construction. Urging of the implement, in particular of the first and the second pivot bearing and/or of the tow bar assembly is moreover also advantageously avoided, a static overdeterminacy or indeterminacy being in particular avoided.

In one aspect of the disclosure, the first vertical axis and the second vertical axis are disposed so as to be mutually parallel, or the first and the second vertical axis in spatial terms are disposed so as to coincide, in particular are disposed so as to be mutually coaxial, and configure a common vertical axis. When the first and the second vertical axis are configured as the common vertical axis, the first and the second pivot bearings are disposed so as to be mutually spaced apart along the common vertical axis. The first and the second pivot bearing, in particular in a state installed in the implement, can thus be disposed so as to be mutually coaxial along the common vertical axis. The common vertical axis, conjointly with the longitudinal axis of the implement, in particular the longitudinal central axis of the implement, and/or the longitudinal axis of the tow bar, in particular the longitudinal central axis of the tow bar, can enclose an angle of 75 degrees to 105 degrees, preferably an angle of 85 degrees to 95 degrees, especially an angle of 90 degrees. The common vertical axis can be common vertical axis that runs vertically to the longitudinal axis of the implement or to the longitudinal axis of the tow bar, in particular an orthogonal common vertical axis. The measure, preferably the disposal of the first and the second pivot axis along the common vertical axis and the disposal of the first and the second pivot bearing along the common vertical axis, has the advantage of a better distribution of the forces and/or torques, in particular of avoiding urging and/or static overdeterminacy. A coupling of the trailing implement part to the tow bar assembly that is simple in terms of construction and simultaneously more stable can thus be configured, wherein furthermore an optimal pivoting capability of the trailing implement part in relation to the tow bar assembly is enabled.

In one aspect of the disclosure, the trailing part of the implement and the tow bar, or the tow bar yoke and the tow bar, are coupled by means of at least one first actuator. The tow bar and/or the trailing part of the implement, or the tow bar and/or the tow bar yoke herein by means of the first actuator are pivotable about the first and the second vertical axis or the common vertical axis in such a manner that a pivot angle between the tow bar and the trailing implement part, in particular the tow bar and the tow bar yoke, is adjustable, preferably also capable of being set and fixedly established. The first actuator can be configured as a hydraulic cylinder. However, it is also conceivable for another activating mode, for example an electric, mechanical or pneumatic activating mode, in particular of a cylinder to be chosen. The first actuator can thus also be configured as an electric motor, for example a spindle motor. A corresponding assembly having a cable pull is also conceivable in order for the activation to be designed to be purely mechanical. Independently of whether the implement or the tow bar assembly is configured with or without the tow bar yoke, the pivot angle can be an angle which is enclosed between the tow bar and the trailing implement part. The pivot angle can be measured as an angle that is enclosed between a longitudinal axis of the tow bar, in particular a longitudinal central axis of the tow bar, and the longitudinal axis of the implement, in particular a longitudinal central axis of the implement. The pivot angle can preferably lie in a plane which is defined by the two longitudinal axes or longitudinal central axes, particularly preferably in a horizontal plane which is defined by the two longitudinal axes. The pivot angle can be 0 degrees to 170 degrees in both pivoting directions, preferably 0 degrees to +/−150 degrees, particularly preferably 0 degrees to +/130 degrees, especially 0 degrees in a straight-line travel of the implement. In other words, the first actuator can be articulated on, in particular coupled and/or fastened to, the trailing implement part and the tow bar or the tow bar yoke and the tow bar, in such a manner that the pivot angle is adjustable, in particular also capable of being set and/or fixedly established, by activating the first actuator. Instead of between the tow bar and the trailing part of the implement, the pivot angle can be adjustable especially between the tow bar and the tow bar yoke. A substantial advantage of this measure is that the pivot angle can be set by means of the first actuator and thus different lateral offsets of the implement, in particular of the tow bar yoke and thus indirectly of the trailing implement part, or directly of the trailing implement part in relation to the tow bar assembly and/or the towing vehicle, can be adjusted. Moreover the implement can advantageously be adapted to different towing vehicles having different track widths and tires of different widths.

A drive component may be disposed so as to be spaced apart between the first and the second pivot bearing, and/or is in particular guided between the first and the second pivot bearing. The drive component is especially guided through the tow bar arm and/or mounted in the tow bar arm. The drive component can be a drive shaft by way of which a power take-off shaft of the towing vehicle is capable of being connected to a drive shaft of the implement and driven. The drive component can be configured in two or multiple parts, preferably comprise a first and a second drive component part, particularly preferably comprise a first and a second drive shaft part. The first and the second drive component part can be connected to one another by means of a universal joint. The universal joint can be mounted in the tow bar arm. The first drive component part can be capable of being coupled to the power take-off shaft of the towing vehicle and the universal joint, and the second drive component part can be capable of being coupled to the universal joint and the drive shaft of the implement. The second drive component part can be disposed between the first and the second pivot bearing, particularly preferably below the first pivot bearing and above the second pivot bearing. The torques and/or forces of the implement and/or of the towing vehicle that act on the drive component thus are also advantageously better distributed such that the drive component is less prone to malfunctioning and/or the assembly of the drive component is configured so as to be more stable in terms of construction.

The tow bar arm may include a tensioning installation. The tensioning installation, at one end of the tensioning installation, includes the second pivot bearing. The tensioning installation, at another end of the tensioning installation, includes a third pivot bearing by way of which the tensioning installation is mounted so as to be pivotable on the tow bar arm. The second and/or the third pivot bearing can be coupled to the tensioning installation, or be fastened thereto, or be configured so as to be integral to the tensioning installation. The tensioning installation can be a length-adjustable tensioning installation. The tensioning installation can thus be designed in such a manner that positional fixing and/or a reciprocating movement and/or an elongation and/or a coaxial movement, in particular along a longitudinal axis of the tensioning device, is enabled between the second and third pivot bearing. The second and/or the third pivot bearing can be a ball bearing. The third pivot bearing can be pivotable about a third vertical axis. The third vertical axis can be parallel to the first and the second vertical axis. The first, the second, and the third vertical axis can be disposed in one plane. The torques and/or forces that act on the implement, in particular the tow bar assembly, are advantageously thus better distributed by means of the tensioning device and the second and/or the third pivot bearing such that the implement, in particular the tow bar assembly, is less prone to malfunctioning. The tensioning device moreover enables simple assembling of the tow bar assembly and/or a desired pretension to be applied to the second and/or the third pivot bearing.

The tow bar assembly on the trailing implement part is mounted so as to be pivotable about a first pivot axis. The first pivot axis is parallel to and/or in spatial terms coincides with a transverse axis of the implement. The trailing implement part and the tow bar assembly, in particular the tow bar yoke, are coupled by means of at least one second actuator, wherein the tow bar assembly, in particular the tow bar yoke, by means of the second actuator is capable of being tilted about the first pivot axis in such a manner that a tilt angle between the tow bar assembly, in particular the tow bar and the trailing implement part is adjustable and may be capable of being set and fixedly established. In other words, the second actuator can be articulated on, in particular coupled and/or fastened to, the trailing implement part and the tow bar yoke, in such a manner that the tilt angle is adjustable, in particular also capable of being set and/or fixedly established, by activating the second actuator.

The first pivot axis can be disposed so as to be perpendicular to the longitudinal axis of the implement and/or to the first vertical axis. The first pivot axis can be parallel to, or in spatial terms coincide with, thus in particular be coaxial with, a transverse axis of the implement, in particular to a horizontal transverse axis of the implement. The tow bar assembly, in particular the tow bar yoke, by means of one or more pivot bearings on the trailing implement part, can be mounted so as to be pivotable about the first pivot axis. At least one, preferably two, three, four, or more, second actuators can be provided. The second actuator can preferably be configured as a hydraulic cylinder. However, it is also conceivable for another activating mode, for example an electric, mechanical or pneumatic activating mode, in particular of a cylinder to be chosen. The second actuator can thus also be configured as an electric motor, for example a spindle motor. A corresponding assembly having a cable pull is also conceivable in order for the activation to be designed to be purely mechanical.

The tilt angle can be an angle between the tow bar assembly, in particular the tow bar, and the trailing implement part. The pivot angle can be an angle that is enclosed between a longitudinal axis of the tow bar, in particular the longitudinal central axis of the tow bar, and an implement vertical axis, thus the vertical axis of the implement, in particular the vertical central axis of the implement. The tilt angle can lie in a plane which is defined by the longitudinal axis of the tow bar and the implement vertical axis, particularly preferably lie in a vertical plane which is defined by the longitudinal axis of the tow bar and the implement vertical axis. The implement vertical axis can be an axis that is vertical to the longitudinal axis of the implement. The tilt angle can be 40 degrees to 140 degrees, preferably 60 degrees to 120 degrees, particularly preferably 80 degrees to 100 degrees.

A height of the tow bar assembly or of the trailing implement part can advantageously be set in relation to the ground by virtue of adjusting the tilt angle such that it is easier for the connector installation to be connected to a towing vehicle. Moreover, the height of the implement, preferably of the tilling element, particularly preferably of the crop receiver, can advantageously be set in relation to the ground on account thereof. For example, a height of the tilling element can be set on account thereof in order for the harvest to be optimized (lower position), or else the ground clearance can be increased, for example when crossing the swath or when entering a field, driving past a dip, etc. On account of this measure, different vertical offsets of the implement, in particular mutual vertical offsets of the tow bar assembly and the trailing implement part, can moreover be set. Moreover, the setting of the tilt angle can advantageously be combined with the setting of the pivot angle.

The first, the second, the third, the fourth, and/or the fifth pivot bearings may include, but are not limited to, a rotary bearing, a ball bearing, or a tilting pin.

The implement may include a control unit which is connected to the first actuator. The control unit is capable of being operated so as to actuate the first actuator in such a manner that the pivot angle is adjustable, in particular capable of being set and/or fixedly established. The control unit may further be connected to the second actuator, whereby the control unit may be capable of being operated so as to actuate the second actuator in such a manner that the tilt angle is adjustable, in particular is capable of being set and/or fixedly established. The control unit can however also be situated on-board the towing vehicle, or in spatial terms can be distributed across the towing vehicle and the implement. The control unit can be connected, in particular in terms of signalling, to the first actuator which serves for adjusting the pivot angle. The control unit can moreover be connected, in particular in terms of signalling, to the second actuator which serves for adjusting the tilt angle. The control unit can thus be designed and specified in such a manner that by way of the first and/or the second actuator the implement, in particular the tow bar assembly and/or the trailing implement part, or the tow bar and the tow bar yoke, respectively, are capable of being adjusted, in particular also mutually pivotable, in such a manner that the pivot angle and/or the tilt angle is capable of being determined and/or memorized and/or outputted and/or set and/or adjusted.

A method for adjusting, in particular setting and/or fixedly establishing the pivot angle and/or the tilt angle can also be capable of being carried out by way of the control unit. Moreover, the control unit in operation can actuate the first and/or the second actuator in such a manner that, for example, the longitudinal axis of the tilling element is at all times oriented so as to be at least approximately orthogonal to a nominal line, this reducing wear in the case of a tilling element that interacts with a swath, for example. One or a plurality of sensors can especially be provided on the implement, in particular in the container or on the tilling element. The sensor or sensors can be distributed across the width of the container and/or of the tilling element. The sensor or sensors can detect a distribution, in particular a lateral distribution, of the harvested crops so as to detect a distribution of harvested crops in the container and/or a distribution of a swath, in particular a cross section or a volume of the swath, on the tilling element. The sensor or sensors can be connected to the control unit. The signal or signals of the sensor or sensors can serve as a further parameter to the control unit for actuating the first and/or the second actuator. The control unit by way of a position-determining installation and/or a detection installation can be impinged with information pertaining to the position of the nominal line. By way of a control unit of this type which varies, in particular periodically or incrementally, the pivot angle and/or the tilt angle during the travel of the implement it can advantageously be achieved that the implement that in the operating position is offset laterally outside the track of the towing vehicle carries out a travel that oscillates in the horizontal direction without the towing vehicle having to vary the direction of travel thereof, and/or the vertical alignment, in particular an operating height, of the implement can be varied while travelling. For example, a bale press or a loading wagon can thus ahead of the swath to be received meander through the terrain laterally behind the towing vehicle that travels in a straight line beside the swath such that the tilling element or the receiving installation in the course of the receiving procedure acquires the comparatively narrow swath at all locations of the operating width of tilling element or receiving installation and/or at an optimal operating height, without the towing vehicle having to vary the travel direction thereof. This measure simultaneously has the advantage that the same implement can be adapted to different towing vehicles with the most minor complexity in terms of adjustment.

The disclosure may further relate to a tow bar assembly for an agricultural implement for coupling, in particular hooking up, the implement to the towing vehicle. The tow bar assembly can include at least one tow bar, one tow bar arm, one first pivot bearing and one second pivot bearing. The tow bar can moreover comprise a tow bar yoke. The tow bar at one end, by means of a first pivot bearing on an implement part that trails the tow bar assembly, can be mounted so as to be pivotable about a first vertical axis, or on the tow bar yoke be mounted so as to be pivotable about the first vertical axis. The tow bar assembly can furthermore comprise a tow bar arm which extends from the tow bar. The tow bar arm at one tow bar arm end, by means of the second pivot bearing on the trailing implement part, can be mounted so as to be pivotable about a second vertical axis, or on the tow bar yoke be mounted so as to be pivotable about the second vertical axis.

The disclosure may further relate to a towing vehicle/implement combination having the towing vehicle and the implement. The towing vehicle/implement combination can be a combination of the towing vehicle and the implement. The implement can be capable of being coupled, or be coupled, respectively, in particular capable of being hooked up, or be hooked up, respectively, to the towing vehicle by means of the tow bar assembly. The towing vehicle can be used for towing and/or pushing the implement; the implement can in particular be towed by the towing vehicle. The towing vehicle can be an agricultural towing vehicle, especially a tractor or a tug, or the like. The towing vehicle can have two, three, or four, or a plurality of wheels, and/or have track chains. The towing vehicle can have driver's cabin, a motor, and a gearbox.

Referring to the Figures, wherein like numerals indicate like parts throughout the several views, a combination is generally shown at 10 in FIG. 1. Referring to FIG. 1, the combination includes a towing vehicle 12 and an agricultural implement 14 having a tow bar assembly 16. The implement 14 may be configured in the form of a round bale press, the implement 14 being coupled to the towing vehicle 10 by means of the tow bar assembly 16.

The towing vehicle 12 may include an agricultural vehicle in the form of a tractor. The fundamental construction of a tractor is understood by those skilled in the art. The towing vehicle 10 is constructed on a supporting frame 18 which is supported on steerable front wheels 20 and rear wheels 22 and supports a cabin 24 in which an operator workplace 26 is situated. The front wheels 20 and/or the rear wheels 22 are driven by a motor which is configured in the form of an internal combustion engine and by a gearbox which interacts with the latter.

The implement 12 includes a chassis or frame 32 which by way of ground-engagement means, here wheels 34, for support is supported on the soil, a tilling element 36 in the form of a crop receiver 38 for receiving harvested crops lying in a swath 40 on the soil, and a conveyor 42 which conveys the harvested crops received by the crop receiver 38 into a container 46 in the form of a bale pressing space 44. The bale pressing space 44 in a manner known to those skilled in the art is delimited by pressing means (not shown). The round bale press can comprise a bale pressing chamber that is not variable in terms of size. The pressing means may be configured as a pressing roll, in particular a multiplicity of pressing rolls that run in parallel for pressing the harvested crops. The rotation axes of the pressing rolls in the case of a closed ejection hatch can lie on an arc, and at least one of the pressing rolls can be driven. The arrangement of the pressing rolls in the bale pressing space 44 can correspond to a cylindrical shape such that the pressing rolls are disposed cylindrically about the round bale and configure a cylindrical circumferential face. Alternatively, the round bale press can also be configured so as to have a bale pressing chamber that is variable in terms of size, or as a round bale press having a variable bale pressing chamber, respectively, wherein the pressing means in this instance can be configured as belts, webbings, or chain assemblies. A finished bale can be ejected through an upwardly pivotable rear door 48 and deposited on the field.

The implement 14 includes the tow bar assembly 16. The tow bar assembly in turn includes a tow bar 50 which is capable of being coupled, or is coupled to the towing vehicle 12 and the implement 14. The tow bar 50 at one end thereof, by means of a first pivot bearing 52, is mounted on an implement part 60, in particular the frame 32 of the implement 12, that trails the tow bar assembly 16, so as to be pivotable about a first vertical axis 70. The tow bar assembly 16 moreover comprises a tow bar arm 54 positioned vertically below the tow bar 50, and which is configured as part of the tow bar 50 and from which the tow bar 50 extends toward the towing vehicle 12.

The tow bar arm 54, at a tow bar arm end, by means of a second pivot bearing 56, is mounted on the trailing implement part 60, in particular likewise the frame 32 of the implement 14, so as to be pivotable about a second vertical axis 72. The first and the second vertical axis 70, 72 are disposed so as to coincide in spatial terms and configured as a common vertical axis 74, and the first and the second pivot bearings 52, 56 are disposed so as to be mutually spaced apart along the common vertical axis 74.

The mechanical drive of the driven elements of the implement 14 takes place by way of a drive component 30, in particular a power take-off shaft 30, from the towing vehicle 10. A drive by electric motors which are supplied with electric energy from the towing vehicle 10 would also be conceivable. The drive component 30 may be disposed in two parts, mounted in the tow bar arm 54, and guided through the tow bar arm 54.

The implement 14 may include a control unit 90 which is connected to a first actuator 80. The control unit 90 is capable of being operated so as to actuate the first actuator 80 in such a manner that a pivot angle 106 (shown in FIGS. 5A, and 5B) is capable of being set. The implement 14 can moreover also have a second actuator 82. The control unit 90 may also be connected to the second actuator 82, and the control unit 90 can be capable of being operated so as to actuate the second actuator 82 in such a manner that a tilt angle 108 (shown in FIG. 6) is capable of being set.

Figure 2:
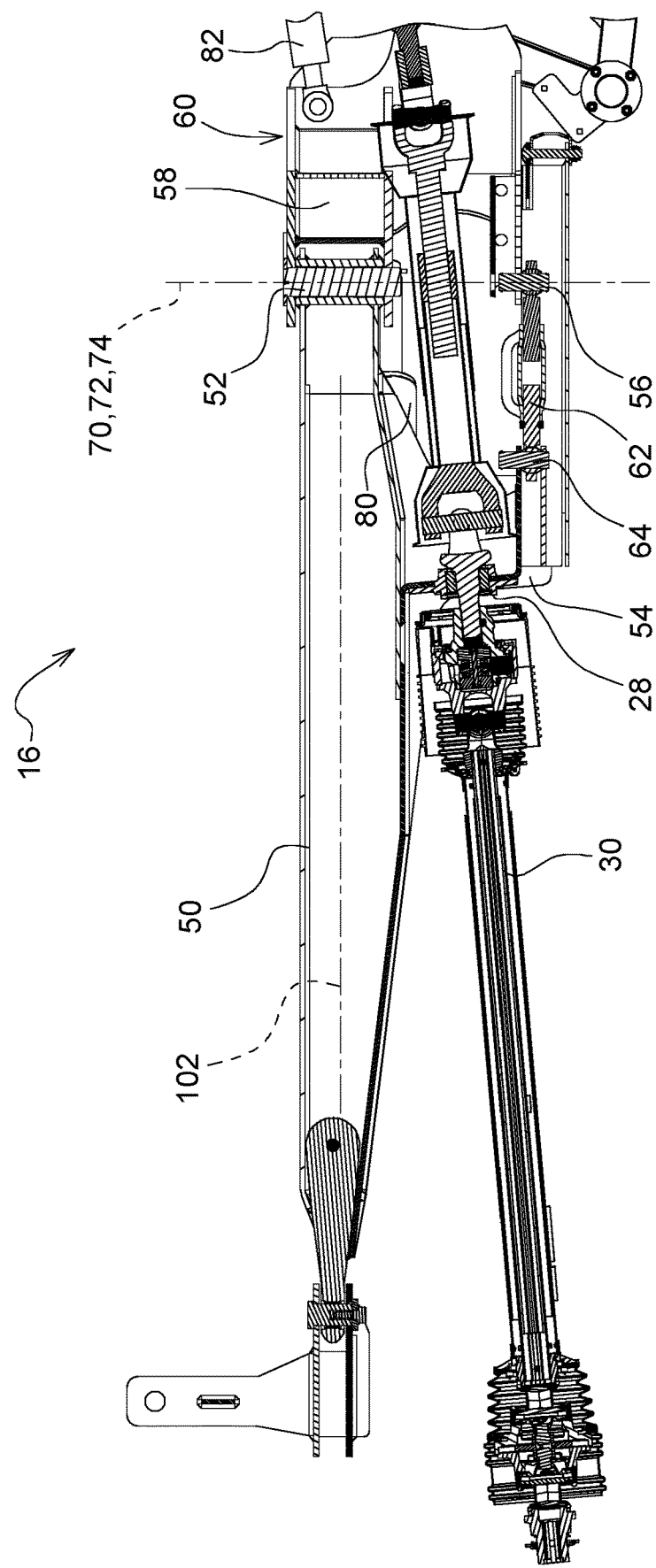
FIG. 2 is a schematic cross-sectional view of the agricultural implement.

Referring to FIG. 2 the trailing part 60 of the implement 14 and the tow bar assembly 16 are coupled to one another. The tow bar assembly 16 includes the tow bar 50, from which the tow bar arm 54 extends and which is configured as part of the tow bar 50, as well as a tow bar yoke 58. The tow bar at one end by means of the first pivot bearing 52 is mounted on the tow bar yoke 58 so as to be pivotable about the first vertical axis 70. The tow bar arm 54 includes a tensioning installation 62, wherein the tensioning installation 62 at one end of the tensioning installation 62 includes the second pivot bearing 56. On account thereof, the tensioning installation 62 by means of the second pivot bearing 56 on the tow bar yoke 58 is mounted so as to be pivotable about the second vertical axis 72. The tensioning installation 62 at the other end of the tensioning installation 62 moreover includes a third pivot bearing 64 by way of which the tensioning installation 62 is pivotably mounted on the part of the tow bar arm 54 that is connected to the tow bar 50.

The first and the second vertical axis 70, 72 are again disposed so as to coincide in spatial terms and configured as a common vertical axis 74. Likewise, the first and the second pivot axis 52, 56 are disposed so as be mutually spaced apart along the common vertical axis 74. The tow bar yoke 58 is connected to the trailing implement part 60. Moreover, the tow bar 50 and the tow bar yoke 58 are coupled by means of the first actuator 80. The first actuator 80 is embodied as a hydraulic cylinder. The tow bar yoke 58 and thus also the trailing part of the implement 60 by means of the first actuator 80 are pivotable about the common vertical axis 74 in such a manner that the pivot angle 106 between the tow bar 50 and the tow bar yoke 58 is capable of being set.

The implement 14, in particular the tow bar assembly 16, furthermore includes the drive component 30 which is vertically disposed below the tow bar 50, between the tow bar 50 and the arm 54, as well as between the first and the second pivot bearings 52, 56. The drive component 30 is rotatable and operable to transmit torque between the towing vehicle 12 and the implement 14. The drive component 30 is moreover configured in two parts and comprises a first and a second drive component part. The first and the second drive component parts are connected to one another by means of a universal joint. The arm may define an opening 28, through which the drive component 30 extends through. The universal joint is mounted in the tow bar arm 54, for example, in the opening 28 of the arm 54. The first drive component part is capable of being coupled to the power take-off shaft of the towing vehicle and the universal joint, and the second drive component part is coupled to the universal joint and the drive shaft of the implement. The second drive component part is disposed between the first and the second pivot bearings 52, 56.

Figure 3A:
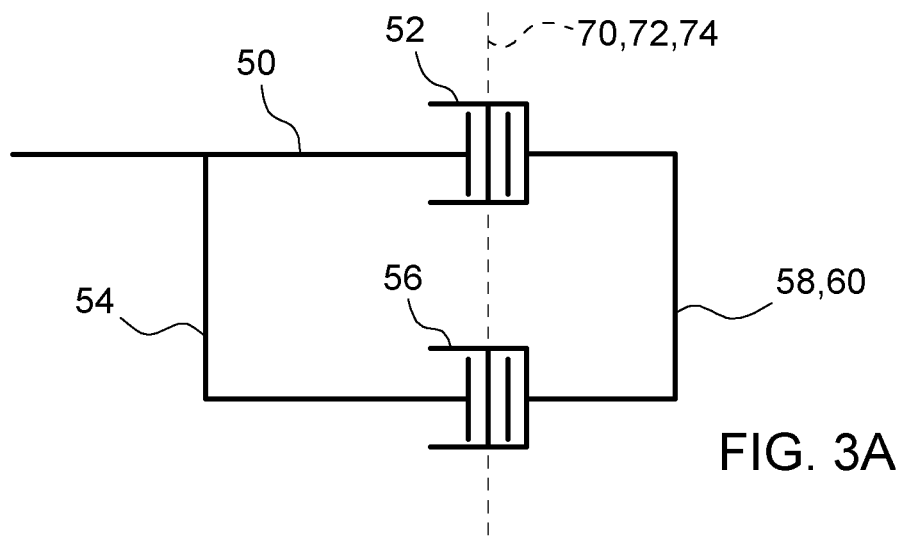
FIG. 3A is a schematic elevation view showing a first example of a relative size between a second pivot bearing and a third pivot bearing of the agricultural implement.
Figure 3B:
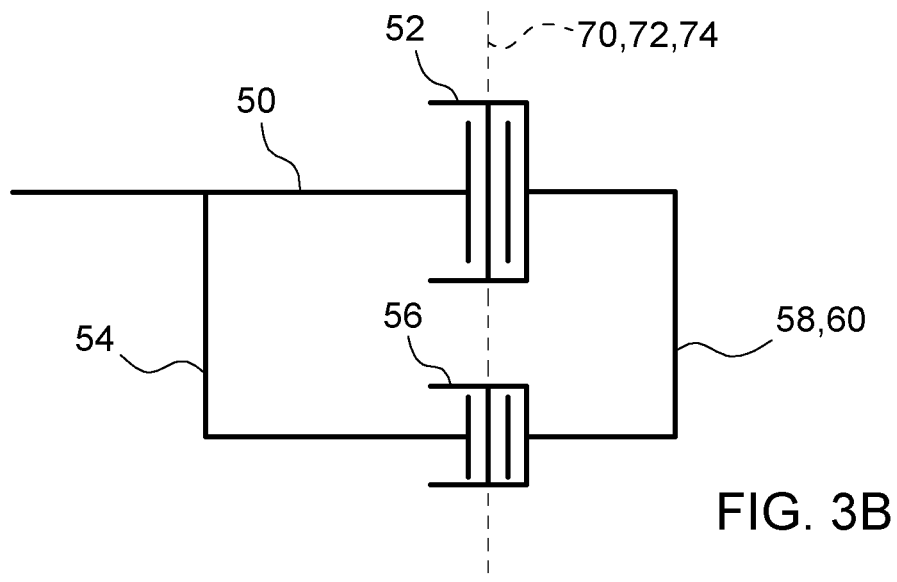
FIG. 3B is a schematic elevation view showing a second example of a relative size between the second pivot bearing and the third pivot bearing of the agricultural implement.
Figure 3C:
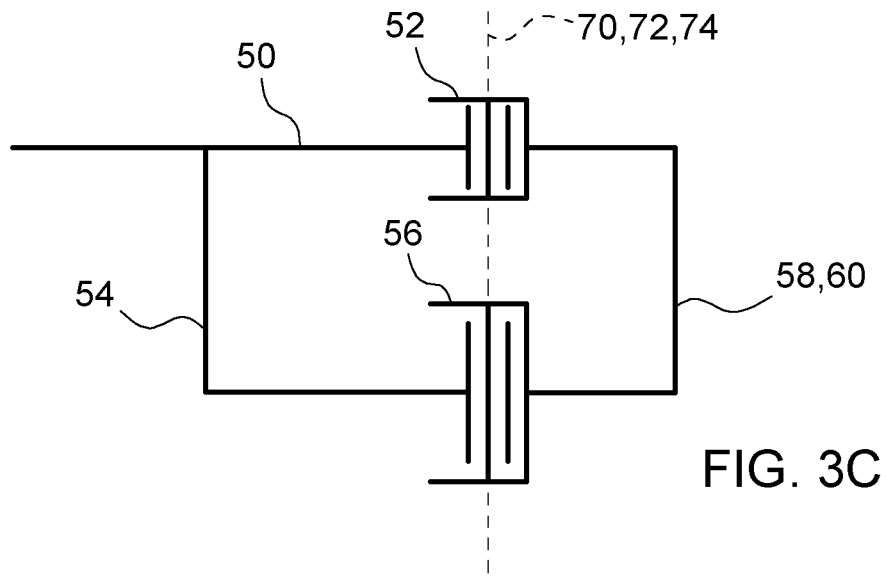
FIG. 3C is a schematic elevation view showing a third example of a relative size between the second pivot bearing and the third pivot bearing of the agricultural implement.

FIGS. 3A-3C show schematic illustrations of the tow bar assembly 16. The first and second pivot bearings 52, 56 shown in FIG. 3A are of identical size. In FIG. 3B, the first pivot bearing 52 is larger than the second pivot bearing 56, that is to say that the first pivot bearing 52 is designed for absorbing higher forces than the second pivot bearing 56. In FIG. 3C the situation is exactly the reverse, that is to say that the first pivot bearing 52 is smaller than the second pivot bearing 56, that is to say that the second pivot bearing 52 is designed for absorbing higher forces than the first pivot bearing 56.

Figure 4:
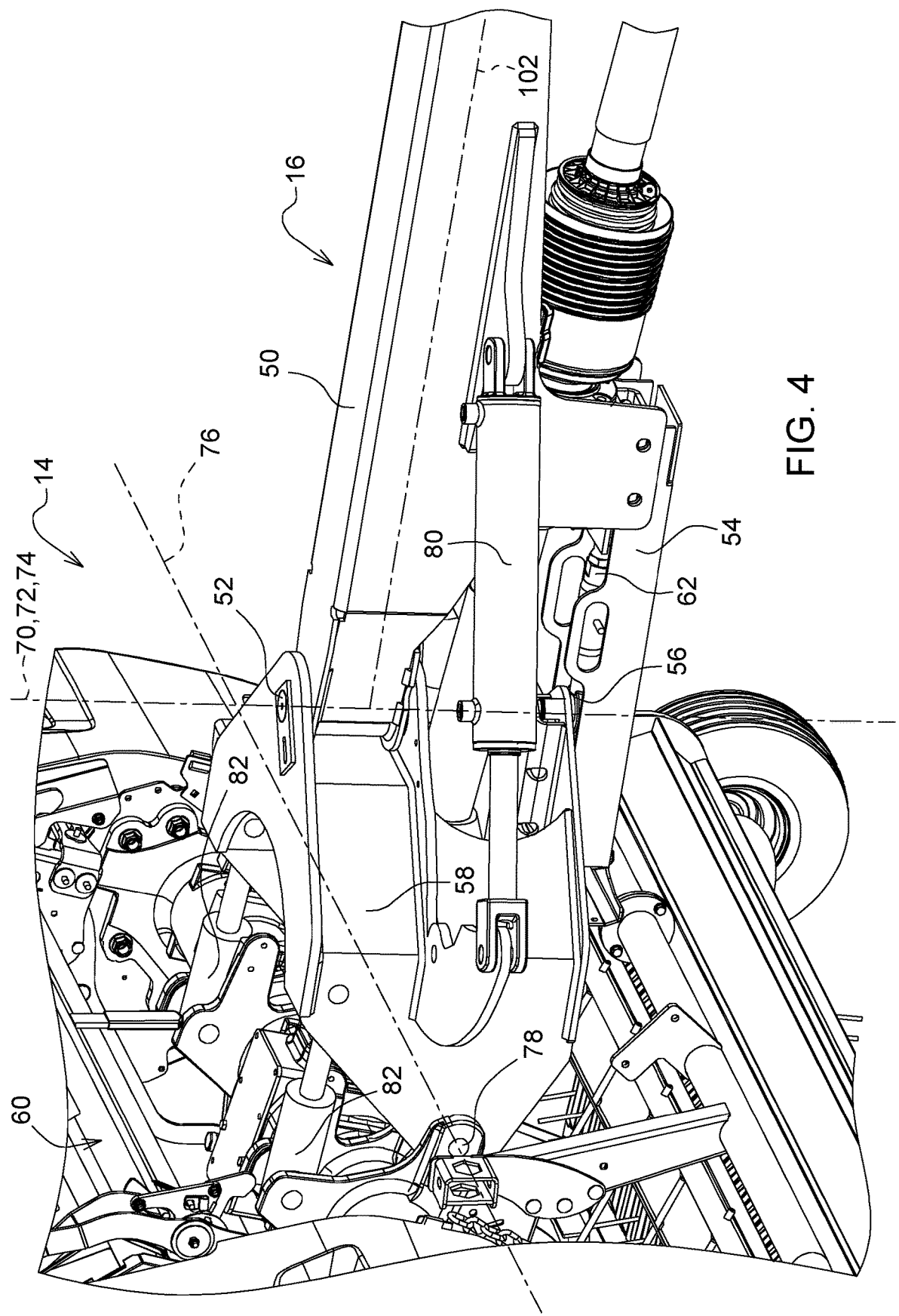
FIG. 4 is a schematic partial perspective view of the agricultural implement and the tow bar assembly.

FIG. 4 shows a schematic perspective illustration of the implement 14. The tow bar assembly 16, in particular the tow bar yoke 58, on the trailing implement part 60 is mounted so as to be pivotable about a first pivot axis 76 that is parallel to or in spatial terms coincides with a horizontal transverse axis of the implement 14. The trailing part of the implement 60 and the tow bar yoke 58 are coupled by means of the second actuator 82. On account thereof, the trailing part of the implement 60 by means of the second actuator 82 is tiltable about the first pivot axis 76 in such a manner that the tilt angle 108 between the tow bar assembly 16 and the trailing implement part 60 is capable of being set. The tow bar assembly 16, in particular the tow bar yoke 58, by means of a fourth pivot bearing 78 which is configured as a tilting pin, is mounted on the trailing implement part 60 so as to be pivotable about the first pivot axis 76. Moreover, the control unit 90 can be connected to the second actuator 82, and the control unit 90 is capable of being operated so as to actuate the second actuator 82 in such a manner that the tilt angle 108 is capable of being set.

Figure 5A:
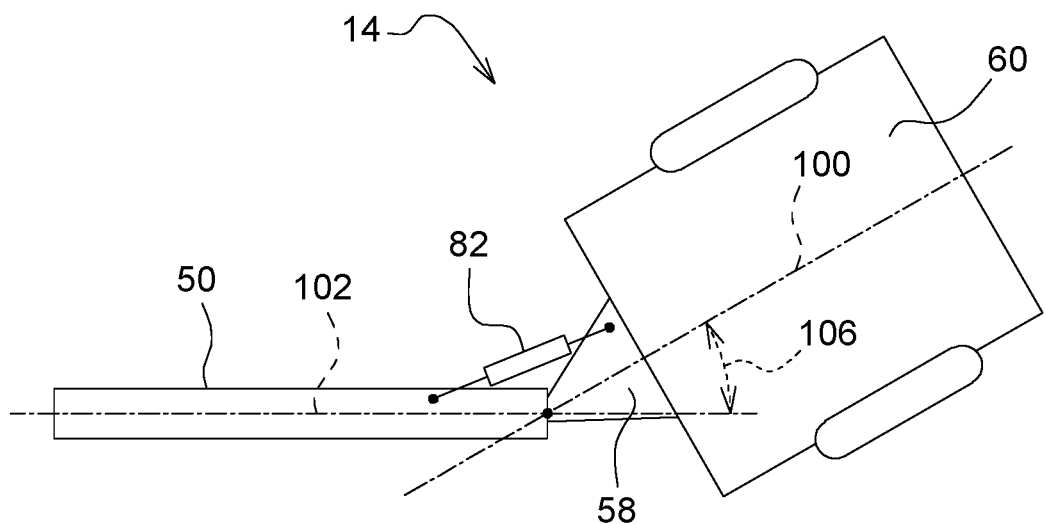
FIG. 5A is a schematic plan view of a first example embodiment of the agricultural implement.
Figure 5B:
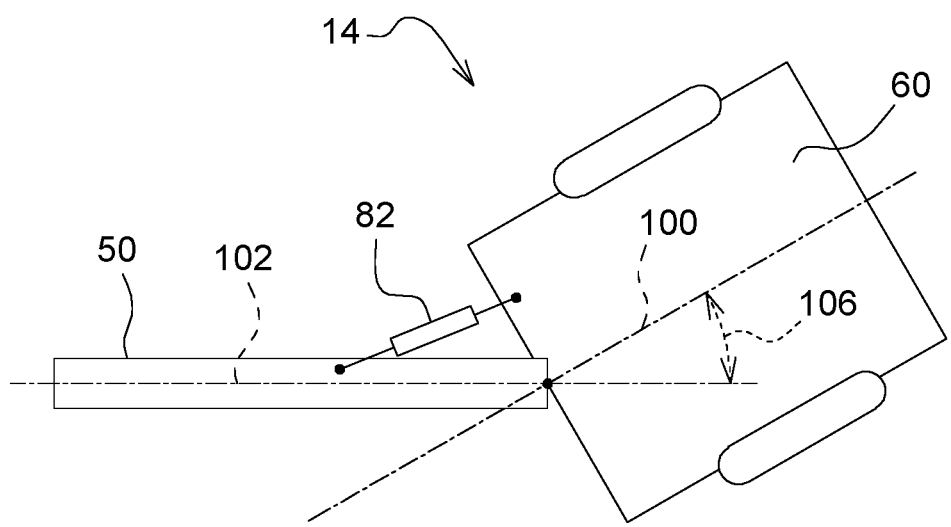
FIG. 5B is a schematic plan view of a second example embodiment of the agricultural implement.

FIGS. 5A and 5B show a schematic plan view illustration the implement 14. As can be derived from FIGS. 5A and 5B, independently of whether the tow bar assembly 16 is configured with (FIG. 5A) or without (FIG. 5B) the tow bar yoke 58, the pivot angle 106 corresponds to an angle which is enclosed by a central longitudinal axis 102 of the tow bar 50 and a central longitudinal axis 100 of the implement 14.

Figure 6:
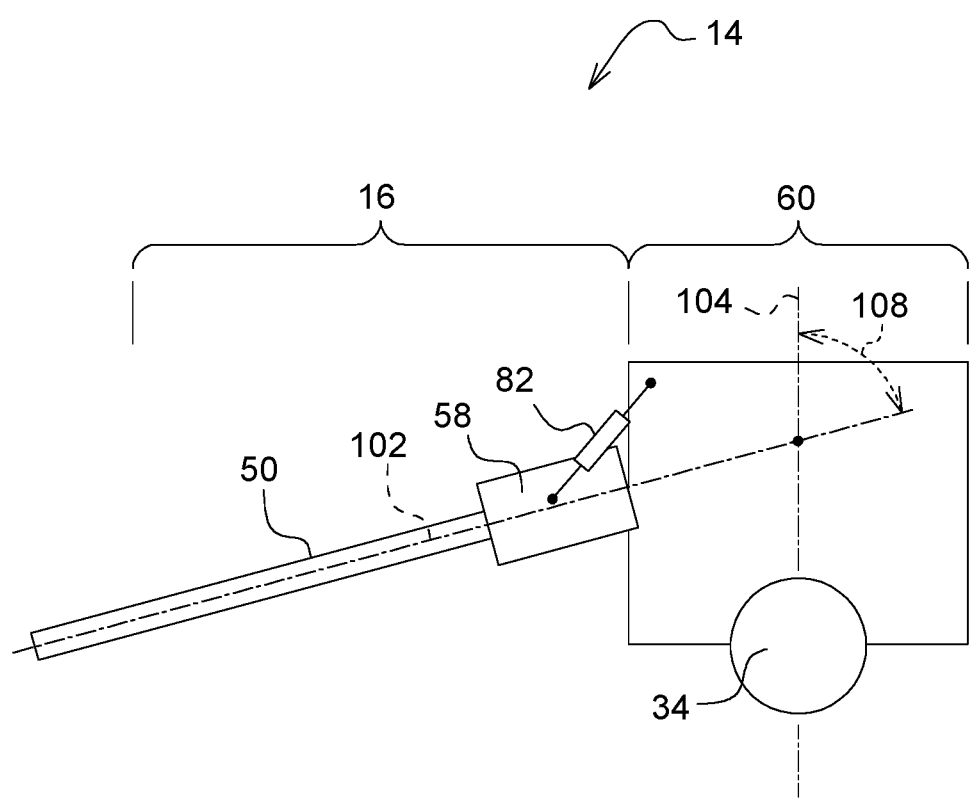
FIG. 6 is a schematic elevation view of the second example embodiment of the agricultural implement.

FIG. 6 shows a schematic elevation view illustration the implement 14. As can be derived from FIG. 6, the tilt angle 108 corresponds to an angle which is enclosed by the longitudinal axis 102 of the tow bar 50 and an implement vertical axis 104, e.g., a central vertical axis of the implement 14.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. An agricultural implement comprising:
a frame;
a tow bar extending along a central longitudinal axis;
an arm attached to the tow bar and disposed in spaced vertical relationship below the tow bar along a first vertical axis relative to the tow bar;
a first pivot bearing rotatably supporting the tow bar for rotation of the tow bar relative to the frame about the first vertical axis, wherein the first vertical axis is perpendicular to the central longitudinal axis of the tow bar;
a second pivot bearing rotatably supporting the arm for rotation of the arm relative to the frame about a second vertical axis, wherein the second vertical axis is perpendicular to the central longitudinal axis of the tow bar; and
a drive component vertically disposed below the tow bar along the first vertical axis, vertically disposed between the tow bar and the arm, and further vertically disposed below the first pivot bearing along the first vertical axis, between the first pivot bearing and the second pivot bearing, wherein the drive component is rotatable and operable to communicate torque.

2. The agricultural implement set forth in claim 1, wherein the first pivot bearing and the second pivot bearing are spaced from each other along the first vertical axis and the second vertical axis.

3. The agricultural implement set forth in claim 1, wherein the first vertical axis and the second vertical axis are co-axially located.

4. The agricultural implement set forth in claim 1, further comprising a first actuator attached to the tow bar and operable to move the tow bar relative to the frame to adjust a pivot angle defined between the central longitudinal axis of the tow bar and a central longitudinal axis of the frame.

5. The agricultural implement set forth in claim 4, further comprising a yoke attached to the frame, with the first pivot bearing interconnecting the yoke and the tow bar, and the second pivot bearing interconnecting the yoke and the arm.

6. The agricultural implement set forth in claim 5, wherein the first actuator is further attached to the yoke.

7. The agricultural implement set forth in claim 5, further comprising a tensioning installation attached to the yoke at the second pivot bearing and attached to the arm at a third pivot bearing.

8. The agricultural implement set forth in claim 5, further comprising at least one fourth pivot bearing interconnecting the yoke and the frame for rotation about a first pivot axis, wherein the first pivot axis is horizontal and perpendicular to the first vertical axis and the second vertical axis.

9. The agricultural implement set forth in claim 8, further comprising a second actuator attached to the frame and the yoke, wherein the second actuator is operable to move the yoke and the tow bar about the first pivot axis relative to the frame to adjust a tilt angle defined between the central longitudinal axis of the tow bar and a vertical axis of the frame.

10. The agricultural implement set forth in claim 9, further comprising a control unit disposed in communication with the first actuator and the second actuator, wherein the control unit is operable to control the first actuator to adjust the pivot angle and control the second actuator to adjust the tilt angle.

11. The agricultural implement set forth in claim 1, wherein the arm defines an opening with the drive component extending through the opening.

12. The agricultural implement set forth in claim 1, wherein the drive component is supported by the arm.

13. An agricultural implement comprising:
a frame;
a tow bar extending along a central longitudinal axis;
an arm attached to the tow bar and disposed in spaced vertical relationship below the tow bar along a first vertical axis relative to the tow bar;
a first pivot bearing rotatably supporting the tow bar for rotation of the tow bar relative to the frame about the first vertical axis, wherein the first vertical axis is perpendicular to the central longitudinal axis of the tow bar;
a second pivot bearing rotatably supporting the arm for rotation of the arm relative to the frame about a second vertical axis, wherein the second vertical axis is perpendicular to the central longitudinal axis of the tow bar;
wherein the first pivot bearing and the second pivot bearing are spaced from each other along the first vertical axis and the second vertical axis, and are co-axially aligned with each other;
a drive component vertically disposed below the tow bar along the first vertical axis, vertically disposed between the tow bar and the arm, and further vertically disposed below the first pivot bearing along the first vertical axis, between the first pivot bearing and the second pivot bearing, wherein the drive component is rotatable and operable to communicate torque; and
a first actuator attached to the tow bar and operable to move the tow bar relative to the frame to adjust a pivot angle defined between the central longitudinal axis of the tow bar and a central longitudinal axis of the frame.

14. The agricultural implement set forth in claim 13, further comprising a yoke attached to the frame, with the first pivot bearing interconnecting the yoke and the tow bar, and the second pivot bearing interconnecting the yoke and the arm.

15. The agricultural implement set forth in claim 14, wherein the first actuator is further attached to the yoke.

16. The agricultural implement set forth in claim 14, further comprising a tensioning installation attached to the yoke at the second pivot bearing and attached to the arm at a third pivot bearing.

17. The agricultural implement set forth in claim 13, wherein the arm defines an opening with the drive component extending through the opening.

18. The agricultural implement set forth in claim 13, wherein the drive component is supported by the arm.

19. An agricultural implement comprising:
a frame;
a tow bar extending along a central longitudinal axis;
an arm attached to the tow bar and disposed in spaced vertical relationship along a first vertical axis relative to the tow bar;
a first pivot bearing rotatably supporting the tow bar for rotation of the tow bar relative to the frame about the first vertical axis, wherein the first vertical axis is perpendicular to the central longitudinal axis of the tow bar;
a second pivot bearing rotatably supporting the arm for rotation of the arm relative to the frame about a second vertical axis, wherein the second vertical axis is perpendicular to the central longitudinal axis of the tow bar;
a first actuator attached to the tow bar and operable to move the tow bar relative to the frame to adjust a pivot angle defined between the central longitudinal axis of the tow bar and a central longitudinal axis of the frame;
a yoke attached to the frame, with the first pivot bearing interconnecting the yoke and the tow bar, and the second pivot bearing interconnecting the yoke and the arm; and
a tensioning installation attached to the yoke at the second pivot bearing and attached to the arm at a third pivot bearing.

20. An agricultural implement comprising:
a frame;
a tow bar extending along a central longitudinal axis;
an arm attached to the tow bar and disposed in spaced vertical relationship along a first vertical axis relative to the tow bar;
a first pivot bearing rotatably supporting the tow bar for rotation of the tow bar relative to the frame about the first vertical axis, wherein the first vertical axis is perpendicular to the central longitudinal axis of the tow bar;
a second pivot bearing rotatably supporting the arm for rotation of the arm relative to the frame about a second vertical axis, wherein the second vertical axis is perpendicular to the central longitudinal axis of the tow bar;
a first actuator attached to the tow bar and operable to move the tow bar relative to the frame to adjust a pivot angle defined between the central longitudinal axis of the tow bar and a central longitudinal axis of the frame;
a yoke attached to the frame, with the first pivot bearing interconnecting the yoke and the tow bar, and the second pivot bearing interconnecting the yoke and the arm;
at least one fourth pivot bearing interconnecting the yoke and the frame for rotation about a first pivot axis, wherein the first pivot axis is horizontal and perpendicular to the first vertical axis and the second vertical axis;
a second actuator attached to the frame and the yoke, wherein the second actuator is operable to move the yoke and the tow bar about the first pivot axis relative to the frame to adjust a tilt angle defined between the central longitudinal axis of the tow bar and a vertical axis of the frame; and
a control unit disposed in communication with the first actuator and the second actuator, wherein the control unit is operable to control the first actuator to adjust the pivot angle and control the second actuator to adjust the tilt angle.

21. An agricultural implement comprising:
a frame;
a tow bar extending along a central longitudinal axis;
an arm attached to the tow bar and disposed in spaced vertical relationship along a first vertical axis relative to the tow bar;

a first pivot bearing rotatably supporting the tow bar for rotation of the tow bar relative to the frame about the first vertical axis, wherein the first vertical axis is perpendicular to the central longitudinal axis of the tow bar;

a second pivot bearing rotatably supporting the arm for rotation of the arm relative to the frame about a second vertical axis, wherein the second vertical axis is perpendicular to the central longitudinal axis of the tow bar;

wherein the first pivot bearing and the second pivot bearing are spaced from each other along the first vertical axis and the second vertical axis, and are co-axially aligned with each other;

a first actuator attached to the tow bar and operable to move the tow bar relative to the frame to adjust a pivot angle defined between the central longitudinal axis of the tow bar and a central longitudinal axis of the frame;

a yoke attached to the frame, with the first pivot bearing interconnecting the yoke and the tow bar, and the second pivot bearing interconnecting the yoke and the arm; and a tensioning installation attached to the yoke at the second pivot bearing and attached to the arm at a third pivot bearing.

\* \* \* \* \*